US012786486B2

(12) United States Patent
Zhu et al.

(10) Patent No.: US 12,786,486 B2
(45) Date of Patent: Nov. 3, 2026

(54) METHOD AND APPARATUS FOR DETERMINING LIVE STREAMING KEYFRAME, STORAGE MEDIUM, AND ELECTRONIC DEVICE

(71) Applicant: Alipay (Hangzhou) Information Technology Co., Ltd., Hangzhou (CN)

(72) Inventors: Hailiang Zhu, Hangzhou (CN); Zongwang Hu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/317,170

(22) Filed: Sep. 3, 2025

(65) Prior Publication Data

US 2026/0095601 A1 Apr. 2, 2026

(30) Foreign Application Priority Data

Sep. 29, 2024 (CN) ........................ 202411377162.7

(51) Int. Cl.
*H04N 21/2187* (2011.01)
*H04N 21/44* (2011.01)

(52) U.S. Cl.
CPC ... *H04N 21/2187* (2013.01); *H04N 21/44008* (2013.01)

(58) Field of Classification Search
CPC ..................... H04N 21/2187; H04N 21/44008
See application file for complete search history.

(56) References Cited

U.S. PATENT DOCUMENTS

| | | | | |
|---|---|---|---|---|
| 8,055,779 | B1 * | 11/2011 | Cheng | H04N 21/26275 709/227 |
| 8,265,145 | B1 * | 9/2012 | Pejhan | H04N 19/156 375/240.11 |
| 9,355,635 | B2 * | 5/2016 | Gao | G10L 15/02 |
| 2005/0074168 | A1 * | 4/2005 | Cooper | G06V 20/40 707/E17.028 |
| 2012/0148157 | A1 * | 6/2012 | Kumar | G06V 10/7715 382/173 |

* cited by examiner

*Primary Examiner* — Mulugeta Mengesha

(57) ABSTRACT

Embodiments of this specification disclose a method and an apparatus for determining a live streaming keyframe, a storage medium, and an electronic device. Feature extraction is performed on a current captured frame of target live streaming by using a feature extraction module, to obtain a feature vector of the current captured frame. The feature vector of the current captured frame is stored in a cache, and a target historical captured frame that is in the cache and that corresponds to the current captured frame is deleted. A feature vector of a plurality of captured frames is read from the cache by using a keyframe calculation module, and at least one keyframe is determined based on the feature vector of the plurality of captured frames. If the current captured frame is in the at least one keyframe, it is determined that the current captured frame is a keyframe.

20 Claims, 3 Drawing Sheets

METHOD AND APPARATUS FOR DETERMINING LIVE STREAMING KEYFRAME, STORAGE MEDIUM, AND ELECTRONIC DEVICE

TECHNICAL FIELD

The present invention relates to computer technologies, and in particular, to a method and an apparatus for determining a live streaming keyframe, a storage medium, and an electronic device.

BACKGROUND

In the conventional technology, keyframe calculation is mainly used to resolve a series of time-consuming, cost-consuming, and other problems that are caused by a large order of magnitude when uniform frame capture is performed on all live streaming and then content risk detection is performed on a captured frame in a live streaming content risk prevention and control. However, in a case of live streaming high concurrency, due to a performance bottleneck caused by a network bandwidth, etc., a current keyframe calculation model service is subject to a significantly prolonged service response delay, and even service unavailability in some cases.

SUMMARY

An object of embodiments of this specification is to provide a method and an apparatus for determining a live streaming keyframe, a storage medium, and an electronic device.

An embodiment of this specification provides a method for determining a live streaming keyframe. A conventional keyframe calculation model service is split into a feature extraction module on an algorithm link and a keyframe calculation module on an engineering link. Each time a current captured frame is received, the feature extraction module can be invoked to perform feature vector extraction, and a feature vector of a historical captured frame is read to perform keyframe calculation on the engineering link. In this way, whether the current captured frame is a keyframe can be immediately determined, to avoid a network bandwidth bottleneck triggered by downloading a repeated captured frame by a model, and alleviate a resource problem and a response delay problem of a keyframe service. The method includes:

- performing, by using a feature extraction module, feature extraction on a current captured frame of target live streaming, to obtain a feature vector of the current captured frame, where a frame sequence number corresponding to the current captured frame is a first sequence number;
- storing the feature vector of the current captured frame in a cache, and deleting a target historical captured frame that is in the cache and that corresponds to the current captured frame, where a difference between the first sequence number and a target sequence number corresponding to the target historical captured frame is a target quantity;
- reading, from the cache by using a keyframe calculation module, a feature vector of a plurality of captured frames whose corresponding frame sequence numbers are from a second sequence number to the first sequence number, and determining at least one keyframe based on the feature vector of the plurality of captured frames, where a difference between the first sequence number and the second sequence number is the target quantity minus one, and a capture time of a captured frame corresponding to the second sequence number is earlier than a capture time of a captured frame corresponding to the first sequence number; and
- if the current captured frame is in the at least one keyframe, determining that the current captured frame is a keyframe.

Further, the method further includes:

- obtaining a sliding window corresponding to a historical captured frame of the target live streaming, where a window length of the sliding window is the target quantity, and a current right boundary of the sliding window is a previous historical captured frame corresponding to the current captured frame;
- the deleting a target historical captured frame that is in the cache and that corresponds to the current captured frame includes:
- sliding the sliding window rightward by one step, so that the current right boundary of the sliding window becomes the current captured frame, and deleting a previous target historical captured frame of a historical captured frame that is in the cache and that corresponds to a current left boundary of the sliding window; and
- the reading, from the cache by using a keyframe calculation module, a feature vector of a plurality of captured frames whose corresponding frame sequence numbers are from a second sequence number to the first sequence number includes:
- reading, from the cache based on the sliding window by using the keyframe calculation module, the feature vector of the plurality of captured frames whose corresponding frame sequence numbers are from the second sequence number to the first sequence number.

Further, the sliding the sliding window rightward by one step, so that the current right boundary of the sliding window becomes the current captured frame, and deleting a previous target historical captured frame of a historical captured frame that is in the cache and that corresponds to a current left boundary of the sliding window includes:

- obtaining a frame quantity corresponding to the historical captured frame that is of the target live streaming and that is currently cached in the cache; and
- if the frame quantity is greater than or equal to the window length of the sliding window, sliding the sliding window rightward by one step, so that the current right boundary of the sliding window becomes the current captured frame, and deleting the previous target historical captured frame of the historical captured frame that is in the cache and that corresponds to the current left boundary of the sliding window.

Further, the method further includes:

- determining the window length of the sliding window based on the target live streaming.

Further, the determining the window length of the sliding window based on the target live streaming includes:

- determining the window length of the sliding window based on streamer information and/or product information that correspond/corresponds to the target live streaming.

Further, the determining the window length of the sliding window based on streamer information and/or product information that correspond/corresponds to the target live streaming includes:

- determining the window length of the sliding window based on the streamer information and/or the product information that correspond/corresponds to the target live streaming and with reference to audience information corresponding to the target live streaming.

Further, the method further includes:

performing content detection on the current captured frame by using a content detection module, to obtain a content detection result corresponding to the current captured frame.

Further, the method further includes:

determining, based on the content detection result corresponding to the current captured frame, whether the window length of the sliding window needs to be adjusted; and sliding the current right boundary of the sliding window rightward if it is determined that the window length of the sliding window needs to be increased; or sliding the current left boundary of the sliding window rightward if it is determined that the window length of the sliding window needs to be decreased.

Further, the determining, based on the content detection result corresponding to the current captured frame, whether the window length of the sliding window needs to be adjusted includes:

determining, based on the content detection result corresponding to the current captured frame and a content detection result corresponding to a historical keyframe that corresponds to the target live streaming and that is located before the current captured frames, whether the window length of the sliding window needs to be adjusted.

An embodiment of this specification further provides an apparatus for determining a live streaming keyframe, including:

a feature vector obtaining module, configured to perform, by using a feature extraction module, feature extraction on a current captured frame of target live streaming, to obtain a feature vector of the current captured frame, where a frame sequence number corresponding to the current captured frame is a first sequence number;

a cache storage module, configured to: store the feature vector of the current captured frame in a cache, and delete a target historical captured frame that is in the cache and that corresponds to the current captured frame, where a difference between the first sequence number and a target sequence number corresponding to the target historical captured frame is a target quantity;

a cache reading module, configured to: read, from the cache by using a keyframe calculation module, a feature vector of a plurality of captured frames whose corresponding frame sequence numbers are from a second sequence number to the first sequence number, and determine at least one keyframe based on the feature vector of the plurality of captured frames, where a difference between the first sequence number and the second sequence number is the target quantity minus one, and a capture time of a captured frame corresponding to the second sequence number is earlier than a capture time of a captured frame corresponding to the first sequence number; and a keyframe determining module, configured to: if the current captured frame is in the at least one keyframe, determine that the current captured frame is a keyframe.

An embodiment of this specification further provides a storage medium. The storage medium stores a computer program, and the computer program is suitable for being loaded and executed by a processor to perform the steps of the above-mentioned method.

An embodiment of this specification further provides an electronic device, including a processor and a memory. The memory stores a computer program, and the computer program is suitable for being loaded and executed by the processor to perform the steps of the above-mentioned method.

In the embodiments of this specification, a method for determining a live streaming keyframe is proposed. A conventional keyframe calculation model service is split into a feature extraction module on an algorithm link and a keyframe calculation module on an engineering link. Each time a current captured frame is received, the feature extraction module can be invoked to perform feature vector extraction, and a feature vector of a historical captured frame is read to perform keyframe calculation on the engineering link. In this way, whether the current captured frame is a keyframe can be immediately determined, to avoid a network bandwidth bottleneck triggered by downloading a repeated captured frame by a model, and alleviate a resource problem and a response delay problem of a keyframe service. This can resolve a problem that in a live streaming high concurrency scenario, calculation of whether a single frame is a keyframe consumes too much time and single machine queries per second (QPS, queries (requests) per second) are limited by a low network bandwidth.

DESCRIPTION OF EMBODIMENTS

To make the objectives, technical solutions, and advantages of this specification clearer, the following clearly and comprehensively describes the technical solutions of this specification with reference to specific embodiments and accompanying drawings of this specification. Clearly, the described embodiments are merely some but not all of the embodiments of this specification. All other embodiments obtained by a person of ordinary skill in the art based on embodiments of this specification without creative efforts shall fall within the protection scope of this specification.

Figure 1:
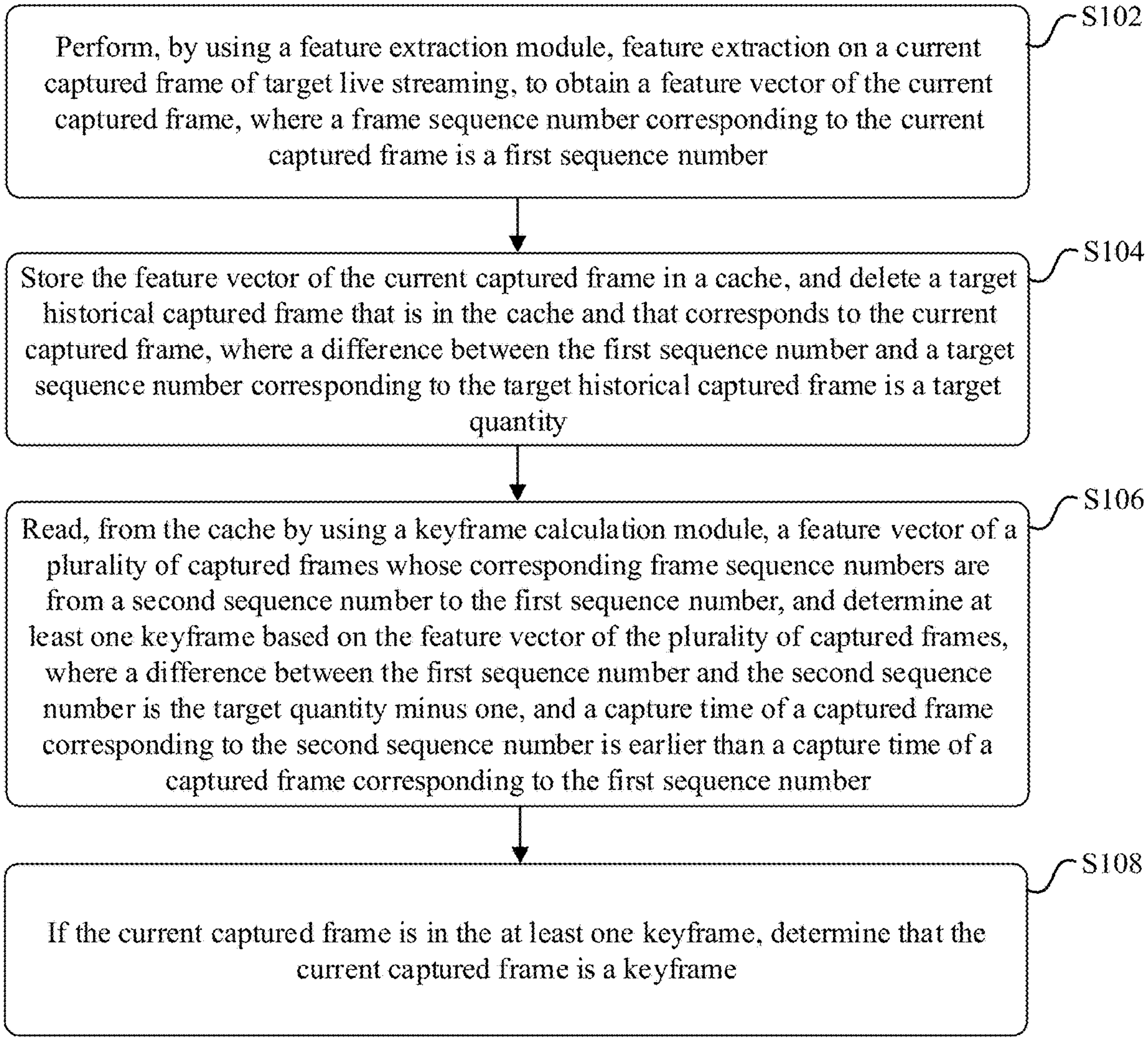
FIG. 1 is a schematic flowchart of a method for determining a live streaming keyframe according to an embodiment of this specification.

FIG. 1 is a schematic flowchart of a method for determining a live streaming keyframe according to an embodiment of this specification. In this embodiment of this specification, the method for determining a live streaming keyframe is applied to an apparatus for determining a live streaming keyframe (briefly referred to as "live streaming keyframe determining apparatus" below) or an electronic device configured with the live streaming keyframe determining apparatus. The following describes the procedure shown in FIG. 1 in detail. The method for determining a live streaming keyframe can specifically include the following steps.

S102: Perform, by using a feature extraction module, feature extraction on a current captured frame of target live streaming, to obtain a feature vector of the current captured frame, where a frame sequence number corresponding to the current captured frame is a first sequence number.

In some embodiments, a current video frame of a live streaming video of the target live streaming is captured from the live streaming video, to obtain a plurality of captured frames corresponding to the target live streaming. Video frames of the live streaming video can be captured uniformly at a fixed time interval. A specific value of the time interval is not limited in this specification. Alternatively, video frames of the live streaming video can be captured ununiformly at an unfixed time interval. That is, a value of the time interval changes in a live streaming process of the target live streaming.

In some embodiments, feature extraction is performed on the current captured frame (namely, a latest obtained captured frame) of the target live streaming by using a feature extraction model on an algorithm link, to obtain the feature vector of the current captured frame. The feature extraction model can input the current captured frame into a trained visual feature extraction model, to obtain the feature vector that corresponds to the current captured frame and that is output by the model. The visual feature extraction model includes but is not limited to a neural network model such as MobileNet, CNN, or VisualTransformer. This is not limited in this specification. The visual feature extraction model is merely an example rather than a limitation. A person skilled in the art should understand that any model used for visual feature extraction can be included in the protection range of this specification.

In some embodiments, all captured frames of the target live streaming correspond to unique, consecutive, and incremental frame sequence numbers. In other words, a frame sequence number corresponding to each captured frame is 1 plus a frame sequence number corresponding to a previous captured frame corresponding to the captured frame. In some embodiments, a capture time corresponding to a captured frame with a corresponding larger frame sequence number is later than a capture time corresponding to a captured frame with a corresponding smaller frame sequence number. In other words, a captured frame with a larger frame sequence number is a later captured video frame of the live streaming video, and a captured frame with a smaller frame sequence number is an earlier captured video frame of the live streaming video. In some embodiments, it is assumed that the frame sequence number corresponding to the current captured frame (namely, the captured current video frame of the target live streaming) is the first sequence number N.

S104: Store the feature vector of the current captured frame in a cache, and delete a target historical captured frame that is in the cache and that corresponds to the current captured frame, where a difference between the first sequence number and a target sequence number corresponding to the target historical captured frame is a target quantity.

In some embodiments, the feature vector of the current captured frame is stored in the cache, and the target historical captured frame corresponding to the current captured frame in the cache is deleted. A historical captured frame is a captured frame that is captured from the target live streaming before the current captured frame and that is stored in the cache. If the frame sequence number corresponding to the current captured frame is the first sequence number N, a frame sequence number corresponding to the target historical captured frame is N−M. That is, the difference between the first sequence number and the target sequence number corresponding to the target historical captured frame is the target quantity M. The target sequence number is less than the first sequence number, and a capture time corresponding to the target historical captured frame is earlier than a capture time corresponding to the current captured frame.

S106: Read, from the cache by using a keyframe calculation module, a feature vector of a plurality of captured frames whose corresponding frame sequence numbers are from a second sequence number to the first sequence number, and determine at least one keyframe based on the feature vector of the plurality of captured frames, where a difference between the first sequence number and the second sequence number is the target quantity minus one, and a capture time of a captured frame corresponding to the second sequence number is earlier than a capture time of a captured frame corresponding to the first sequence number.

In some embodiments, the feature vector of the plurality of captured frames whose corresponding frame sequence numbers are from the second sequence number to the first sequence number is read from the cache by using a keyframe calculation module on an engineering link. The plurality of captured frames include the current captured frame and at least one historical captured frame that corresponds to the target live streaming and that is stored in the cache before the current captured frame. For example, if the frame sequence number corresponding to the current captured frame is the first sequence number N, and the target quantity is M, the second sequence number is N−M+1. That is, the second sequence number is the first sequence number minus the target quantity plus 1. A difference between the first sequence number and the second sequence number is N−(N−M+1)=M−1. That is, the difference between the first sequence number and the second sequence number is the target quantity minus 1. The second sequence number is less than the first sequence number, and the capture time of the captured frame corresponding to the second sequence number is earlier than the capture time corresponding to the current captured frame.

In some embodiments, the keyframe calculation module and the feature extraction module are two independent modules running in parallel, rather than running in serial. That is, the two modules have no serial relationship, namely, do not run in sequence.

In some embodiments, the keyframe calculation module determines a keyframe list through calculation in the plurality of captured frames based on the feature vector of the plurality of captured frames. The keyframe list includes a frame sequence number (or other frame identification information) corresponding to at least one keyframe in the plurality of captured frames. For example, the keyframe calculation module inputs the feature vector of the plurality of captured frames into a trained keyframe model, to obtain a keyframe list output by the model. It should be noted herein that the above-mentioned manner of inputting the feature vector of the plurality of captured frames into the trained keyframe model to obtain the keyframe list is only an example rather than a limitation. It should be understood by a person skilled in the art that any manner of determining the keyframe list based on the feature vector of the plurality of captured frames can be included in the protection scope of this specification.

S108: If the current captured frame is in the at least one keyframe, determine that the current captured frame is a keyframe.

In some embodiments, whether the current captured frame whose corresponding frame sequence number is the first sequence number N is in at least one keyframe in the keyframe list is determined; and if yes, it is determined that the current captured frame is a keyframe. For example, whether all frame sequence numbers in the keyframe list include the frame sequence number corresponding to the current captured frame, namely, the first sequence number N is determined; and if yes, it is determined that the current captured frame is a keyframe. In some embodiments, if it is determined that the current captured frame is a keyframe, the current captured frame is sent to a content detection module, and the content detection module detects whether risk content exists in the current captured frame. If it is determined that the current captured frame is not a keyframe, the procedure ends.

In this embodiment of this specification, a method for determining a live streaming keyframe is proposed. A conventional keyframe calculation model service is split into a feature extraction module on an algorithm link and a keyframe calculation module on an engineering link. Each time a current captured frame is received, the feature extraction module can be invoked to perform feature vector extraction, and a feature vector of a historical captured frame is read to perform keyframe calculation on the engineering link. In this way, whether the current captured frame is a keyframe can be immediately determined, to avoid a network bandwidth bottleneck triggered by downloading a repeated captured frame by a model, and alleviate a resource problem and a response delay problem of a keyframe service. This can resolve a problem that in a live streaming high concurrency scenario, calculation of whether a single frame is a keyframe consumes too much time and single machine QPS are limited by a low network bandwidth.

In some embodiments, the method further includes: obtaining a sliding window corresponding to a historical captured frame of the target live streaming. A window length of the sliding window is the target quantity, and a current right boundary of the sliding window is a previous historical captured frame corresponding to the current captured frame. The deleting a target historical captured frame that is in the cache and that corresponds to the current captured frame includes: sliding the sliding window rightward by one step, so that the current right boundary of the sliding window becomes the current captured frame, and deleting a previous target historical captured frame of a historical captured frame that is in the cache and that corresponds to a current left boundary of the sliding window. The reading, from the cache by using a keyframe calculation module, a feature vector of a plurality of captured frames whose corresponding frame sequence numbers are from a second sequence number to the first sequence number includes: reading, from the cache based on the sliding window by using the keyframe calculation module, the feature vector of the plurality of captured frames whose corresponding frame sequence numbers are from the second sequence number to the first sequence number. In some embodiments, the sliding window corresponding to the historical captured frame that is of the target live streaming and that is stored in the cache is obtained. The length of the sliding window is a preset target quantity. The length of the sliding window is equal to a maximum quantity of captured frames included in the sliding window, the sliding window currently includes a plurality of historical captured frames corresponding to the target live streaming, the current right boundary of the sliding window is the previous historical captured frame corresponding to the current captured frame, and the current left boundary of the sliding window is a historical captured frame with the smallest frame sequence number in the plurality of historical captured frames included in the sliding window. In some embodiments, the sliding window is slid rightward by one step, so that the current right boundary of the sliding window becomes the current captured frame. The window length of the sliding window remains unchanged in a sliding process. The current left boundary of the sliding window becomes a next historical captured frame of the historical captured frame corresponding to a left boundary before the sliding window. Then, a previous target historical captured frame of the historical captured frame corresponding to the current left boundary of the sliding window is deleted from the cache. That is, the historical captured frame that is in the cache and that corresponds to the left boundary before the sliding window is deleted. In some embodiments, the feature vector of the plurality of captured frames corresponding to the target live streaming that are included in the sliding window is read from the cache based on the sliding window by using the keyframe calculation module. Because the current right boundary of the sliding window is the current captured frame (the corresponding frame sequence number is the first sequence number N), the current left boundary is a historical captured frame whose corresponding frame sequence number is the second sequence number N−M+1. That is, the second sequence number is the first sequence number minus the target quantity plus 1. The difference between the first sequence number and the second sequence number is N−(N−M+1)=M−1. That is, the difference between the first sequence number and the second sequence number is the target quantity minus 1. Frame sequence numbers corresponding to the plurality of captured frames included in the sliding window are from the second sequence number to the first sequence number. That is, the feature vector of the plurality of captured frames whose corresponding frame sequence numbers are from the second sequence number to the first sequence number is read from the cache based on the sliding window by using the keyframe calculation module.

In some embodiments, the sliding the sliding window rightward by one step, so that the current right boundary of the sliding window becomes the current captured frame, and deleting a previous target historical captured frame of a historical captured frame that is in the cache and that corresponds to a current left boundary of the sliding window includes: obtaining a frame quantity corresponding to the historical captured frame that is of the target live streaming and that is currently cached in the cache; and if the frame quantity is greater than or equal to the window length of the sliding window, sliding the sliding window rightward by one step, so that the current right boundary of the sliding window becomes the current captured frame, and deleting the previous target historical captured frame of the historical captured frame that is in the cache and that corresponds to the current left boundary of the sliding window. In some embodiments, the frame quantity corresponding to all historical captured frames that are of the target live streaming and that are currently cached in the cache is obtained, and then whether the frame quantity is greater than or equal to the window length (namely, the preset target quantity) of the sliding window is determined. If yes, the sliding window is slid rightward by one step, so that the current right boundary of the sliding window becomes the current captured frame. The window length of the sliding window remains unchanged in a sliding process. The current left boundary of the sliding window becomes the next historical captured frame of the historical captured frame corresponding to the left boundary before the sliding window. Then, the previous target historical captured frame of the historical captured frame corresponding to the current left boundary of the sliding window is deleted from the cache. That is, the historical captured frame that is in the cache and that corresponds to the left boundary before the sliding window is deleted. Otherwise, the above-mentioned operations are not performed. That is, neither the sliding window is moved, nor the historical captured frame in the cache is deleted.

In some embodiments, the method further includes: determining the window length of the sliding window based on the target live streaming. In some embodiments, the sliding window is a fixed window. In other words, the window length corresponding to the sliding window is fixed. In some embodiments, the window length of the sliding window is determined based on a related attribute of the target live streaming. For example, a preset window length corresponding to a live streaming type (including but not limited to product sale live streaming, game live streaming, outdoor live streaming, gourmet live streaming, entertainment live streaming, etc.) of the target live streaming is used as the window length of the sliding window based on the live streaming type. For another example, based on a live streaming start time of the target live streaming, a preset window length corresponding to a time interval of the live streaming start time is used as the window length of the sliding window, and a preset window length corresponding to a time interval in the evening is greater than a preset window length corresponding to a time interval in the daytime. For another example, based on live streaming popularity of the target live streaming, a preset window length corresponding to a popularity interval corresponding to the live streaming popularity is used as the window length of the sliding window, and live streaming with higher live streaming popularity corresponds to a larger window length of the sliding window.

In some embodiments, the determining the window length of the sliding window based on the target live streaming includes: determining the window length of the sliding window based on streamer information and/or product information that correspond/corresponds to the target live streaming. In some embodiments, the window length of the sliding window can be determined based on the streamer information corresponding to the target live streaming. For example, the window length of the sliding window is determined based on audience evaluation information received by a streamer corresponding to the target live streaming. A worse audience evaluation corresponding to the streamer of the target live streaming causes a larger window length of the sliding window. For another example, the window length of the sliding window is determined based on a risk detection result of the streamer corresponding to the target live streaming in a historical live streaming process of the streamer. A worse risk detection result of historical live streaming corresponding to the streamer of the target live streaming causes a larger window length of the sliding window. In some embodiments, if the target live streaming is product sale live streaming, the window length of the sliding window can be determined based on product information sold in the target live streaming. For example, the window length of the sliding window is determined based on type information of a product sold in the target live streaming. A window length of a sliding window corresponding to live streaming of selling underwear is greater than a window length of a sliding window corresponding to live streaming of selling fruits and vegetables. For another example, the window length of the sliding window is determined based on an average risk detection result corresponding to a plurality of times of historical live streaming (the historical live streaming and the target live streaming do not need to have the same streamer) corresponding to the product sold in the target live streaming. A worse average risk detection result corresponding to the plurality of times of historical live streaming causes a larger window length of the sliding window. In some embodiments, the window length of the sliding window can also be comprehensively determined based on the streamer information and the product information that correspond to the target live streaming. For example, the window length of the sliding window corresponding to the target live streaming is larger in a case of a larger quantity of attentions of the streamer corresponding to the target live streaming and a worse post-sales evaluation corresponding to the product sold in the target live streaming.

In some embodiments, the determining the window length of the sliding window based on streamer information and/or product information that correspond/corresponds to the target live streaming includes: determining the window length of the sliding window based on the streamer information and/or the product information that correspond/corresponds to the target live streaming and with reference to audience information corresponding to the target live streaming. In some embodiments, the window length of the sliding window can be comprehensively determined based on the streamer information and the product information that correspond to the target live streaming and with reference to the audience information corresponding to the target live streaming. For example, the window length of the sliding window corresponding to the target live streaming is larger in a case of a smaller quantity of likes of the streamer corresponding to the target live streaming, a lower price that is of a product sold in the target live streaming and that is lower than a market average price, a larger quantity of audiences corresponding to the target live streaming, or a larger quantity of users with a potential risk in the audience corresponding to the target live streaming.

In some embodiments, the method further includes: performing content detection on the current captured frame by using a content detection module, to obtain a content detection result corresponding to the current captured frame. In some embodiments, if it is determined that the current captured frame is a keyframe, the current captured frame is sent to the content detection module, and a content detection result corresponding to the current captured frame is obtained by using the content detection module. That is, whether risk content exists in the current captured frame is detected. The content detection result includes indication information used to indicate whether risk content exists in the current captured frame or probability information used to indicate whether risk content exists in the current captured frame. In some embodiments, the content detection module, the keyframe calculation module, and the feature extraction module are three independent modules running in parallel, rather than running in serial. That is, the three modules have no serial relationship, namely, do not run in sequence.

In some embodiments, the method further includes: determining, based on the content detection result corresponding to the current captured frame, whether the window length of the sliding window needs to be adjusted; and sliding the current right boundary of the sliding window rightward if it is determined that the window length of the sliding window needs to be increased; or sliding the current left boundary of the sliding window rightward if it is determined that the window length of the sliding window needs to be decreased.

In some embodiments, the sliding window is a dynamic window. To be specific, the window length of the sliding window can change in the live streaming process of the target live streaming. In some embodiments, if the current captured frame is a keyframe, whether the window length of the sliding window needs to be adjusted can be determined based on the content detection result corresponding to the current captured frame. For example, if the content detection result indicates that risk content exists in the current captured frame, it is determined that the window length of the sliding window needs to be increased. For another example, if the content detection result indicates that no risk content exists in the current captured frame, it is determined that the window length of the sliding window needs to be decreased. For example, if a probability that is in the content detection result and that is used to indicate whether risk content exists in the current captured frame is greater than or equal to a first preset probability, it is determined that the window length of the sliding window needs to be increased. For another example, if a probability that is in the content detection result and that is used to indicate whether risk content exists in the current captured frame is less than a second preset probability, it is determined that the window length of the sliding window needs to be decreased. In some embodiments, if it is determined that the window length of the sliding window needs to be increased, the window length of the sliding window can be increased by sliding the current right boundary of the sliding window rightward; or if it is determined that the window length of the sliding window needs to be decreased, the window length of the sliding window can be decreased by sliding the current left boundary of the sliding window rightward. In some embodiments, if the content detection result includes the probability used to represent whether risk content exists in the current captured frame, a length value by which the window length needs to be increased or a length value by which the window length needs to be decreased can be determined based on a value of the probability or a difference (or an absolute value of the difference) between a value of the probability and a preset probability (a first preset probability or a second preset probability).

In some embodiments, the determining, based on the content detection result corresponding to the current captured frame, whether the window length of the sliding window needs to be adjusted includes: determining, based on the content detection result corresponding to the current captured frame and a content detection result corresponding to a historical keyframe that corresponds to the target live streaming and that is located before the current captured frames, whether the window length of the sliding window needs to be adjusted. In some embodiments, if the current captured frame is a keyframe, whether the window length of the sliding window needs to be adjusted can be determined based on the content detection result corresponding to the current captured frame and the content detection result corresponding to the historical keyframe that corresponds to the target live streaming and that is located before the current captured frames. For example, if all content detection results respectively corresponding to the current captured frame and a plurality of consecutive historical keyframes whose quantity is greater than or equal to a preset quantity and that are located before the current captured frame indicate that risk content exists in the current captured frame, it is determined that the window length of the sliding window needs to be increased. For another example, if all content detection results respectively corresponding to the current captured frame and a plurality of consecutive historical keyframes whose quantity is greater than or equal to a preset quantity and that are located before the current captured frame indicate that no risk content exists in the current captured frame, it is determined that the window length of the sliding window needs to be decreased. For example, if all probabilities that are in content detection results respectively corresponding to the current captured frame and a plurality of consecutive historical keyframes whose quantity is greater than or equal to a preset quantity and that are located before the current captured frame and that are used to indicate whether risk content exists in the current captured frame are greater than or equal to the first preset probability, it is determined that the window length of the sliding window needs to be increased. For another example, if all probabilities that are in content detection results respectively corresponding to the current captured frame and a plurality of consecutive historical keyframes whose quantity is greater than or equal to a preset quantity and that are located before the current captured frame and that are used to indicate whether risk content exists in the current captured frame are less than the second preset probability, it is determined that the window length of the sliding window needs to be decreased.

Figure 2:
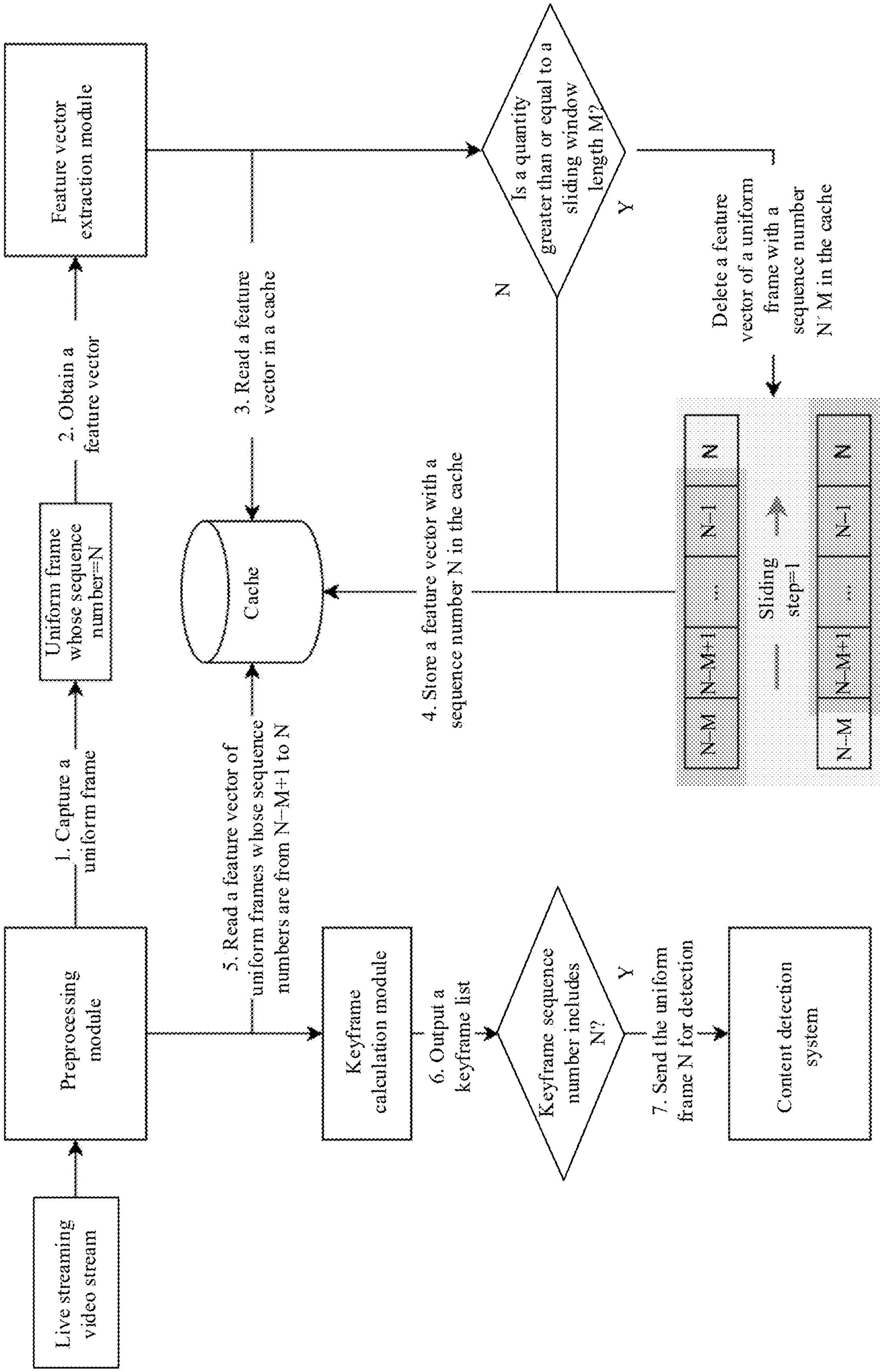
FIG. 2 is a schematic flowchart of an example of a method for determining a live streaming keyframe according to an embodiment of this specification.

FIG. 2 is a schematic flowchart of an example of a method for determining a live streaming keyframe according to an embodiment of this specification.

As shown in FIG. 2, video frames of a live streaming video stream are uniformly captured by using a preprocessing module. It is assumed that a frame sequence number corresponding to a current uniform frame (namely, a captured frame) is N. A feature vector of the current uniform frame is obtained by using a feature vector extraction module. A feature vector of a historical uniform frame that is in a cache and that is located before the current uniform frame is read. Whether a quantity of historical uniform frames is greater than or equal to a sliding window length M is determined. If yes, a feature vector of a uniform frame whose corresponding frame sequence number is N−M in the cache is deleted, and a sliding window is slid rightward by one step, so that a current right boundary of the sliding window changes from a uniform frame with a frame sequence number N−1 to the current uniform frame, a current left boundary of the sliding window changes from the uniform frame with the frame sequence number N−M to a uniform frame with a frame sequence number N−M+1. Then, the feature vector of the current uniform frame is stored in the cache. If no, the feature vector of the current uniform frame is directly stored in the cache. The keyframe calculation module reads, from the cache, a feature vector of uniform frames whose frame sequence numbers are from N−M+1 to N, outputs a keyframe list, and determines whether a frame sequence number of a keyframe in the keyframe list includes N. If yes, the uniform frame (namely, the current uniform frame) with the frame sequence number N is sent to a content detection system for detection.

Figure 3:
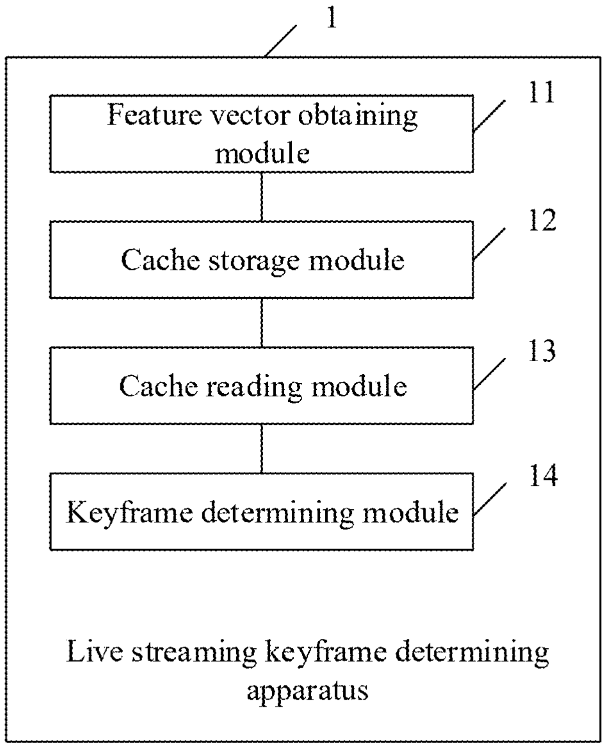
FIG. 3 is a schematic structural diagram of an apparatus for determining a live streaming keyframe according to an embodiment of the present specification.

FIG. 3 is a schematic structural diagram of an apparatus for determining a live streaming keyframe according to an embodiment of this specification. The apparatus for determining a live streaming keyframe (briefly referred to as "live streaming keyframe determining apparatus 1" below) can be implemented as all or a part of an electronic device by using software, hardware, or a combination thereof. According to some embodiments, the live streaming keyframe determining apparatus 1 includes a feature vector obtaining module 11, a cache storage module 12, a cache reading module 13, and a keyframe determining module 14.

The feature vector obtaining module 11 is configured to perform, by using a feature extraction module, feature extraction on a current captured frame of target live streaming, to obtain a feature vector of the current captured frame. A frame sequence number corresponding to the current captured frame is a first sequence number.

The cache storage module 12 is configured to: store the feature vector of the current captured frame in a cache, and delete a target historical captured frame that is in the cache and that corresponds to the current captured frame. A difference between the first sequence number and a target sequence number corresponding to the target historical captured frame is a target quantity.

The cache reading module 13 is configured to: read, from the cache by using a keyframe calculation module, a feature vector of a plurality of captured frames whose corresponding frame sequence numbers are from a second sequence number to the first sequence number, and determine at least one keyframe based on the feature vector of the plurality of captured frames. A difference between the first sequence number and the second sequence number is the target quantity minus one, and a capture time of a captured frame corresponding to the second sequence number is earlier than a capture time of a captured frame corresponding to the first sequence number.

The keyframe determining module 14 is configured to: if the current captured frame is in the at least one keyframe, determine that the current captured frame is a keyframe.

In some embodiments, the live streaming keyframe determining apparatus 1 is further configured to obtain a sliding window corresponding to a historical captured frame of the target live streaming. A window length of the sliding window is the target quantity, and a current right boundary of the sliding window is a previous historical captured frame corresponding to the current captured frame. The deleting a target historical captured frame that is in the cache and that corresponds to the current captured frame includes: sliding the sliding window rightward by one step, so that the current right boundary of the sliding window becomes the current captured frame, and deleting a previous target historical captured frame of a historical captured frame that is in the cache and that corresponds to a current left boundary of the sliding window. The reading, from the cache by using a keyframe calculation module, a feature vector of a plurality of captured frames whose corresponding frame sequence numbers are from a second sequence number to the first sequence number includes: reading, from the cache based on the sliding window by using the keyframe calculation module, the feature vector of the plurality of captured frames whose corresponding frame sequence numbers are from the second sequence number to the first sequence number.

In some embodiments, the sliding the sliding window rightward by one step, so that the current right boundary of the sliding window becomes the current captured frame, and deleting a previous target historical captured frame of a historical captured frame that is in the cache and that corresponds to a current left boundary of the sliding window includes: obtaining a frame quantity corresponding to the historical captured frame that is of the target live streaming and that is currently cached in the cache; and if the frame quantity is greater than or equal to the window length of the sliding window, sliding the sliding window rightward by one step, so that the current right boundary of the sliding window becomes the current captured frame, and deleting the previous target historical captured frame of the historical captured frame that is in the cache and that corresponds to the current left boundary of the sliding window.

In some embodiments, the live streaming keyframe determining apparatus 1 is further configured to determine the window length of the sliding window based on the target live streaming.

In some embodiments, the determining the window length of the sliding window based on the target live streaming includes: determining the window length of the sliding window based on streamer information and/or product information that correspond/corresponds to the target live streaming.

In some embodiments, the determining the window length of the sliding window based on streamer information and/or product information that correspond/corresponds to the target live streaming includes: determining the window length of the sliding window based on the streamer information and/or the product information that correspond/corresponds to the target live streaming and with reference to audience information corresponding to the target live streaming.

In some embodiments, the live streaming keyframe determining apparatus 1 is further configured to perform content detection on the current captured frame by using a content detection module, to obtain a content detection result corresponding to the current captured frame.

In some embodiments, the live streaming keyframe determining apparatus 1 is further configured to: determine, based on the content detection result corresponding to the current captured frame, whether the window length of the sliding window needs to be adjusted; and slide the current right boundary of the sliding window rightward if it is determined that the window length of the sliding window needs to be increased; or slide the current left boundary of the sliding window rightward if it is determined that the window length of the sliding window needs to be decreased.

In some embodiments, the determining, based on the content detection result corresponding to the current captured frame, whether the window length of the sliding window needs to be adjusted includes: determining, based on the content detection result corresponding to the current captured frame and a content detection result corresponding to a historical keyframe that corresponds to the target live streaming and that is located before the current captured frames, whether the window length of the sliding window needs to be adjusted.

The apparatus embodiments correspond to the method embodiments. For specific descriptions, references can be made to the descriptions in the method embodiments. Details are omitted here for simplicity. The apparatus embodiments are obtained based on the corresponding method embodiments, and have the same technical effects as the corresponding method embodiments. For specific descriptions, references can be made to the corresponding method embodiments.

An embodiment of this specification further provides a computer storage medium. The computer storage medium can store a plurality of instructions, and the instructions are suitable for the processor to load and execute the method in the embodiments of this specification.

An embodiment of this specification further provides a computer program product. The computer program product stores at least one instruction, and the at least one instruction is loaded and executed by the processor in the method in the embodiments of this specification.

Figure 4:
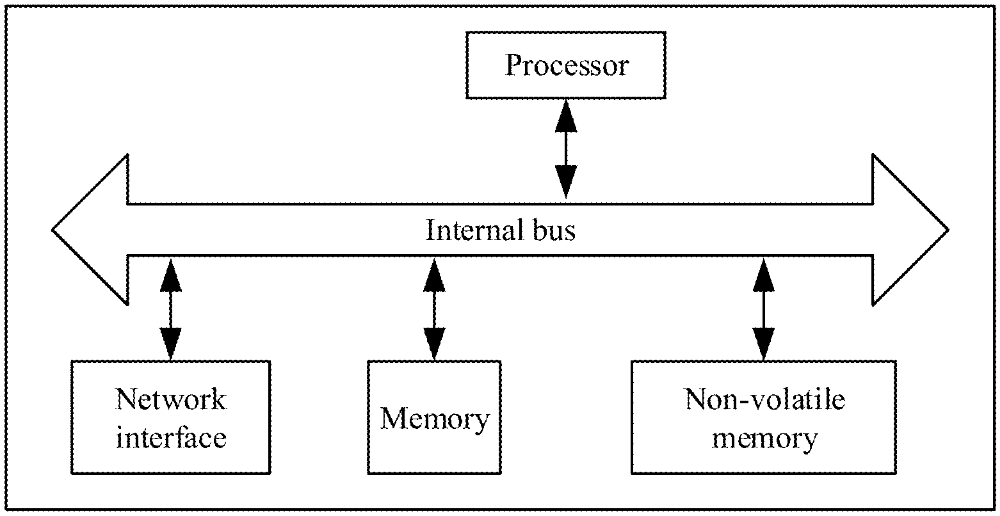
FIG. 4 is a schematic structural diagram of an electronic device according to an embodiment of this specification.

An embodiment of this specification further provides a schematic structural diagram of an electronic device shown in FIG. 4. As shown in FIG. 4, in terms of hardware, the electronic device includes a processor, an internal bus, a network interface, a memory, and a non-volatile memory, and certainly can further include hardware needed by another service. The processor reads a corresponding computer program from the non-volatile memory into the memory and then runs the computer program, to implement the method in the embodiments of this specification.

The system, apparatus, module, or unit illustrated in the above-mentioned embodiments can be specifically implemented by using a computer chip or an entity, or can be implemented by using a product having a specific function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

A person skilled in the art should understand that the embodiments of this specification can be provided as methods, systems, or computer program products. Therefore, a form of hardware only embodiments, software only embodiments, or embodiments with a combination of software and hardware can be used in this specification. In addition, a form of a computer program product that is implemented on one or more computer-usable storage media (including but not limited to a disk memory, a CD-ROM, an optical memory, etc.) that include computer-usable program code can be used in this specification.

This specification is described with reference to the flowcharts and/or block diagrams of the method, the device (system), and the computer program product according to the embodiments of this specification. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable storage that can instruct the computer or the another programmable data processing device to work in a specific way, so the instructions stored in the computer-readable storage generate an artifact that includes an instruction apparatus. The instruction apparatus implements a specific function in one or more processes in the flowcharts and/or in one or more blocks in the block diagrams.

These computer program instructions can alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

It should be further noted that the terms "include", "comprise", or any other variants thereof are intended to cover a non-exclusive inclusion, so that a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the presence of additional identical elements in the process, method, product, or device that includes the element.

This specification can be described in the general context of computer-executable instructions, for example, a program module. Generally, the program module includes a routine, a program, an object, a component, a data structure, etc. executing a specific task or implementing a specific abstract data type. This specification can alternatively be practiced in distributed computing environments. In the distributed computing environments, tasks are performed by remote processing devices connected through a communication network. In the distributed computing environments, the program module can be located in a local and remote computer storage medium including a storage device.

The embodiments of this specification are described in a progressive method. For same or similar parts in the embodiments, refer to each other. Each embodiment focuses on a difference from other embodiments. Particularly, the system embodiments are basically similar to the method embodiments, and therefore are described briefly. For related parts, references can be made to some descriptions in the method embodiments.

The above-mentioned descriptions are merely embodiments of this specification, and are not intended to limit this specification. A person skilled in the art can make various changes and variations to this specification. Any modifications, equivalent replacements, improvements, etc. made without departing from the spirit and principle of this specification shall fall within the scope of the claims of this specification.

The invention claimed is:

1. A method for determining a live streaming keyframe, comprising:

performing, by using a feature extraction module, feature extraction on a current captured frame of target live streaming, to obtain a feature vector of the current captured frame, wherein a frame sequence number corresponding to the current captured frame is a first sequence number;

storing the feature vector of the current captured frame in a cache, and deleting a target historical captured frame that is in the cache and that corresponds to the current captured frame, wherein a difference between the first sequence number and a target sequence number corresponding to the target historical captured frame is a target quantity;

reading, from the cache by using a keyframe calculation module, a feature vector of a plurality of captured frames whose corresponding frame sequence numbers are from a second sequence number to the first sequence number, and determining at least one keyframe based on the feature vector of the plurality of captured frames, wherein a difference between the first sequence number and the second sequence number is the target quantity minus one, and a capture time of a captured frame corresponding to the second sequence number is earlier than a capture time of a captured frame corresponding to the first sequence number; and if the current captured frame is in the at least one keyframe, determining that the current captured frame is a keyframe.

2. The method according to claim 1, further comprising: obtaining a sliding window corresponding to a historical captured frame of the target live streaming, wherein a window length of the sliding window is the target quantity, and a current right boundary of the sliding window is a previous historical captured frame corresponding to the current captured frame;

the deleting a target historical captured frame that is in the cache and that corresponds to the current captured frame comprises:

sliding the sliding window rightward by one step, so that the current right boundary of the sliding window becomes the current captured frame, and deleting a previous target historical captured frame of a historical captured frame that is in the cache and that corresponds to a current left boundary of the sliding window; and the reading, from the cache by using a keyframe calculation module, a feature vector of a plurality of captured frames whose corresponding frame sequence numbers are from a second sequence number to the first sequence number comprises:

reading, from the cache based on the sliding window by using the keyframe calculation module, the feature vector of the plurality of captured frames whose corresponding frame sequence numbers are from the second sequence number to the first sequence number.

3. The method according to claim 2, wherein the sliding the sliding window rightward by one step, so that the current right boundary of the sliding window becomes the current captured frame, and deleting a previous target historical captured frame of a historical captured frame that is in the cache and that corresponds to a current left boundary of the sliding window comprises:

obtaining a frame quantity corresponding to the historical captured frame that is of the target live streaming and that is currently cached in the cache; and if the frame quantity is greater than or equal to the window length of the sliding window, sliding the sliding window rightward by one step, so that the current right boundary of the sliding window becomes the current captured frame, and deleting the previous target historical captured frame of the historical captured frame that is in the cache and that corresponds to the current left boundary of the sliding window.

4. The method according to claim 2, further comprising: determining the window length of the sliding window based on the target live streaming.

5. The method according to claim 4, wherein the determining the window length of the sliding window based on the target live streaming comprises:

determining the window length of the sliding window based on streamer information and/or product information corresponding to the target live streaming.

6. The method according to claim 5, wherein the determining the window length of the sliding window based on streamer information and/or product information that correspond/corresponds to the target live streaming comprises:

determining the window length of the sliding window based on the streamer information and/or the product information corresponding to the target live streaming and with reference to audience information corresponding to the target live streaming.

7. The method according to claim 2, further comprising: performing content detection on the current captured frame by using a content detection module, to obtain a content detection result corresponding to the current captured frame.

8. The method according to claim 7, further comprising: determining, based on the content detection result corresponding to the current captured frame, whether the window length of the sliding window needs to be adjusted; and sliding the current right boundary of the sliding window rightward if it is determined that the window length of the sliding window needs to be increased; or sliding the current left boundary of the sliding window rightward if it is determined that the window length of the sliding window needs to be decreased.

9. The method according to claim 8, wherein the determining, based on the content detection result corresponding to the current captured frame, whether the window length of the sliding window needs to be adjusted comprises:

determining, based on the content detection result corresponding to the current captured frame and a content detection result corresponding to a historical keyframe that corresponds to the target live streaming and that is located before the current captured frames, whether the window length of the sliding window needs to be adjusted.

10. An electronic device, comprising a processor and a memory, wherein the memory stores a computer program, and when the processor executes the computer program, the electronic device is caused to:

perform, by using a feature extraction module, feature extraction on a current captured frame of target live streaming, to obtain a feature vector of the current captured frame, wherein a frame sequence number corresponding to the current captured frame is a first sequence number;

store the feature vector of the current captured frame in a cache, and delete a target historical captured frame that is in the cache and that corresponds to the current captured frame. wherein a difference between the first sequence number and a target sequence number corresponding to the target historical captured frame is a target quantity;

read, from the cache by using a keyframe calculation module, a feature vector of a plurality of captured frames whose corresponding frame sequence numbers are from a second sequence number to the first sequence number, and determine at least one keyframe based on the feature vector of the plurality of captured frames, wherein a difference between the first sequence number and the second sequence number is the target quantity minus one, and a capture time of a captured frame corresponding to the second sequence number is earlier than a capture time of a captured frame corresponding to the first sequence number; and if the current captured frame is in the at least one keyframe, determine that the current captured frame is a keyframe.

11. The electronic device according to claim 10, is further caused to:

obtain a sliding window corresponding to a historical captured frame of the target live streaming, wherein a window length of the sliding window is the target quantity, and a current right boundary of the sliding window is a previous historical captured frame corresponding to the current captured frame;

the electronic device being caused to delete a target historical captured frame that is in the cache and that corresponds to the current captured frame comprises being caused to:

slide the sliding window rightward by one step, so that the current right boundary of the sliding window becomes the current captured frame, and delete a previous target historical captured frame of a historical captured frame that is in the cache and that corresponds to a current left boundary of the sliding window; and the electronic device being caused to read, from the cache by using a keyframe calculation module, a feature vector of a plurality of captured frames whose corresponding frame sequence numbers are from a second sequence number to the first sequence number comprises being caused to:

read, from the cache based on the sliding window by using the keyframe calculation module, the feature vector of the plurality of captured frames whose corresponding frame sequence numbers are from the second sequence number to the first sequence number.

12. The electronic device according to claim 11, wherein the electronic device being caused to slide the sliding window rightward by one step, so that the current right boundary of the sliding window becomes the current captured frame, and delete a previous target historical captured frame of a historical captured frame that is in the cache and that corresponds to a current left boundary of the sliding window comprises being caused to:

obtain a frame quantity corresponding to the historical captured frame that is of the target live streaming and that is currently cached in the cache; and if the frame quantity is greater than or equal to the window length of the sliding window, slide the sliding window rightward by one step, so that the current right boundary of the sliding window becomes the current captured frame, and delete the previous target historical captured frame of the historical captured frame that is in the cache and that corresponds to the current left boundary of the sliding window.

13. The electronic device according to claim 11, is further caused to:

determine the window length of the sliding window based on the target live streaming.

14. The electronic device according to claim 13, wherein the electronic device being caused to determine the window length of the sliding window based on the target live streaming comprises being caused to:

determine the window length of the sliding window based on streamer information and/or product information corresponding to the target live streaming.

15. The electronic device according to claim 14, wherein the electronic device being caused to determine the window length of the sliding window based on streamer information and/or product information that correspond/corresponds to the target live streaming comprises being caused to:

determine the window length of the sliding window based on the streamer information and/or the product information corresponding to the target live streaming and with reference to audience information corresponding to the target live streaming.

16. A non-transitory storage medium storing a computer program, which when executed by a processor causes the processor to:

perform, by using a feature extraction module, feature extraction on a current captured frame of target live streaming, to obtain a feature vector of the current captured frame, wherein a frame sequence number corresponding to the current captured frame is a first sequence number;

store the feature vector of the current captured frame in a cache, and delete a target historical captured frame that is in the cache and that corresponds to the current captured frame, wherein a difference between the first sequence number and a target sequence number corresponding to the target historical captured frame is a target quantity;

read, from the cache by using a keyframe calculation module, a feature vector of a plurality of captured frames whose corresponding frame sequence numbers are from a second sequence number to the first sequence number, and determine at least one keyframe based on the feature vector of the plurality of captured frames, wherein a difference between the first sequence number and the second sequence number is the target quantity minus one, and a capture time of a captured frame corresponding to the second sequence number is earlier than a capture time of a captured frame corresponding to the first sequence number; and if the current captured frame is in the at least one keyframe, determine that the current captured frame is a keyframe.

17. The non-transitory storage medium according to claim 16, wherein the processor further comprises being caused to:

obtain a sliding window corresponding to a historical captured frame of the target live streaming, wherein a window length of the sliding window is the target quantity, and a current right boundary of the sliding window is a previous historical captured frame corresponding to the current captured frame;

the processor being caused to delete a target historical captured frame that is in the cache and that corresponds to the current captured frame comprises being caused to:

slide the sliding window rightward by one step, so that the current right boundary of the sliding window becomes the current captured frame, and delete a previous target historical captured frame of a historical captured frame that is in the cache and that corresponds to a current left boundary of the sliding window; and the processor being caused to read, from the cache by using a keyframe calculation module, a feature vector of a plurality of captured frames whose corresponding frame sequence numbers are from a second sequence number to the first sequence number comprises being caused to:

read, from the cache based on the sliding window by using the keyframe calculation module, the feature vector of the plurality of captured frames whose corresponding frame sequence numbers are from the second sequence number to the first sequence number.

18. The non-transitory storage medium according to claim 17, wherein the processor being caused to slide the sliding window rightward by one step, so that the current right boundary of the sliding window becomes the current captured frame, and delete a previous target historical captured frame of a historical captured frame that is in the cache and that corresponds to a current left boundary of the sliding window comprises being caused to:

obtain a frame quantity corresponding to the historical captured frame that is of the target live streaming and that is currently cached in the cache; and if the frame quantity is greater than or equal to the window length of the sliding window, slide the sliding window rightward by one step, so that the current right boundary of the sliding window becomes the current captured frame, and delete the previous target historical captured frame of the historical captured frame that is in the cache and that corresponds to the current left boundary of the sliding window.

19. The non-transitory storage medium according to claim 17, wherein the processor further comprises being caused to:

determine the window length of the sliding window based on the target live streaming.

20. The non-transitory storage medium according to claim 19, wherein the processor being caused to determine the window length of the sliding window based on the target live streaming comprises being caused to:

determine the window length of the sliding window based on streamer information and/or product information corresponding to the target live streaming.

* * * * *